No. 877,540. PATENTED JAN. 28, 1908.
E. L. WOOD.
FAUCET.
APPLICATION FILED JUNE 6, 1907.
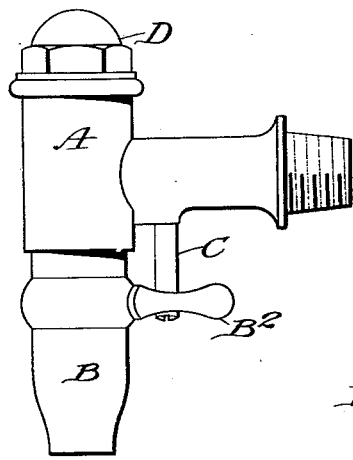
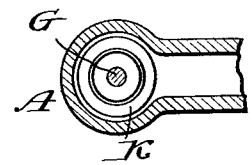
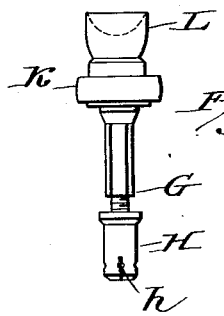
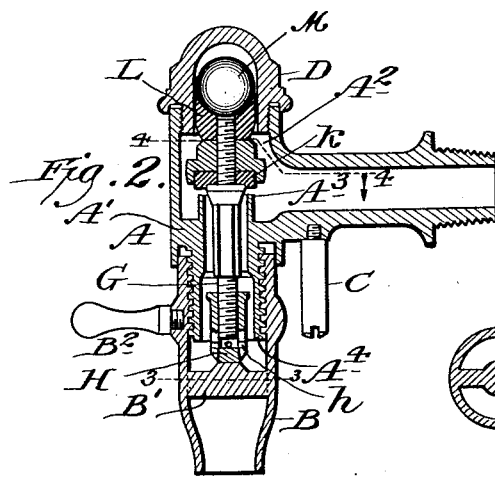
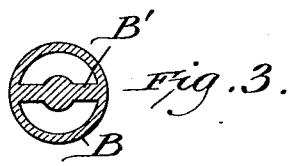
WITNESSES
A. R. Appleman
A. E. W. Frazer
INVENTOR
Edward L. Wood
BY
Thomas Drew Stetson
ATTORNEY

UNITED STATES PATENT OFFICE.

EDWARD L. WOOD, OF NEW YORK, N. Y.

FAUCET.

No. 877,540.        Specification of Letters Patent.        Patented Jan. 28, 1908.

Application filed June 6, 1907. Serial No. 377,483.

*To all whom it may concern:*

Be it known that I, EDWARD L. WOOD, a citizen of the United States, residing in the borough of Queens, city and State of New York, engineer, have invented a certain new and useful Improvement in Faucets, of which the following is a specification.

My improved faucet may be used in a great variety of situations and for any fluids, but it is intended more particularly for lavatories, sinks and the like, and I shall refer to the liquid as water.

The invention applies to the class in which a valve opens and closes by an endwise movement,—a single puppet. I will describe it as opened by the long-approved method of forcing it upward from below by partially revolving a nozzle in line therewith beneath, and as having a bearing face of rubber adapted to insure a tight closure when subjected to a moderate pressure in the direction to close it. Under ordinary conditions there is a considerable head of water the pressure of which will insure a tight closing, but other conditions may require assistance. I have discovered that a very gentle force will attain that end reliably and that it is practicable to provide by very simple means not only to press down with gentle force on the valve in addition to the pressure of the water but also to serve usefully in limiting the opening movement, in steadying the valve, and thus avoiding the tendency to rattle which is a fault in this class of valves as ordinarily arranged, and in compelling the valve to shut without hammering under any conditions.

The following is a description of what I consider the best means of carrying out the invention.

The accompanying drawing forms a part of this specification.

Figure 1 is a side view with the nozzle turned into the closed position. Fig. 2 is a central vertical section with the nozzle partially turned enough to take up the slack and commence to open the valve. Fig. 3 is a horizontal section on the line 3—3 in Fig. 2. Fig. 4 is a horizontal section on the line 4—4 in Fig. 2. Fig. 5 is a side view of a part detached.

Similar letters of reference indicate like parts in all the figures where they appear.

A is the body of the faucet, A¹ the head, A² a chamber above, A³ a tubular seat for the valve and A⁴ an extension downward, screw-threaded on its exterior.

B is the partially revoluble discharging nozzle screw-threaded on its interior to match screw-threads on A⁴, having a cross-bridge B¹ in its interior and provided with a convenient detachable handle B² by which it can be turned at will.

C is a stop firmly set in the body A of the faucet and arranged to limit the turning motion of the nozzle.

D is a top removably set in line with the valve packed as shown and engaged by screw-threads. Its hollow interior is cylindrical, its top hemi-spherical.

G is the stem of the valve and H an adjustable lengthener or shoe through which the lifting force is received from the bridge B¹, when the nozzle B is turned in the direction to open. There are openings $h$ in this shoe, preferably in the form of open slots, one in each side, which supply an elastic quality to the shoe so that it hugs the screw-threaded stem within with reliable tightness even with imperfect workmanship and wear. The upper end of the stem G carries a valve K of long-approved construction, I have shown it as packed with vulcanized rubber.

L is a cup-shaped cap tightly set on the upper end of the stem.

The body K of the valve is of such height that the screw-threaded portion of the stem extends but little above the valve.

M is a ball preferably of lead or other heavy metal or alloy, of such diameter as to make an easy fit in the interior of the top D. The concave upper surface of the valve-cup L matches to this ball. The presence of the ball insures a perfect guidance and steadying of the valve-cup and consequently of the valve.

In cases of extremely low pressure where the water exerts no appreciable force to urge the valve down to its seat the ball by its gravity aids to effect the closing.

The faucet may be closed with all the rapidity which is ever required in the most active practice; but it can never hammer, the descent of the ball being always sufficiently retarded by the requirement that the water must move past it through a narrow annular space. This space should be just sufficient to make the fit easy. The valve in its turn is held gently to the ball by the closeness of the fit of the valve-cup thereto.

I claim as my invention:—

1. In a faucet of the puppet class, the combination, with a body having a valve seat, a valve, and means for raising the valve and releasing and allowing it to sink, of a chamber above the valve, and a loosely mounted member arranged to move up and down in said chamber, said loosely mounted member being arranged to guide the valve, to limit the extent of its opening movement and to act upon it gravitationally to aid in closing it.

2. In a faucet of the puppet class, the combination, with a body having a valve seat, and fluid passages connected therewith, a valve, and means for raising the valve and releasing it and allowing it to sink, of a chamber above the valve, and a loosely mounted member arranged to move easily in said chamber to guide the valve, to limit the extent of its opening, to act upon it gravitationally to aid in closing it and to moderate the velocity of the closing movement.

3. The combination, with a valve body having a puppet-valve seat, a cylindrical chamber in line with and above the seat, and a screw-threaded extension in line below the seat, of a partly rotatable delivery nozzle mounted on the threaded extension, means for turning said delivery nozzle, a valve, a valve-stem arranged to be engaged by the delivery nozzle to lift the valve, a receptacle carried by the stem, and a spherical member mounted loosely in said receptacle and arranged to move in said chamber.

4. The combination, with a valve body having a puppet-valve seat, a cylindrical chamber in line with and above the seat, and a screw-threaded extension in line below the seat, of a partly rotatable delivery nozzle mounted on the threaded extension, means for turning said delivery nozzle, a valve, a valve-stem arranged to be engaged by the delivery nozzle to lift the valve and having an adjustable shoe at its bottom, a receptacle carried by the stem, and a spherical member mounted loosely in said receptacle and arranged to move in said chamber.

Signed at New York, N. Y., this 5th day of June 1907.

EDWARD L. WOOD.

Witnesses:
GEO. MCKITTRICK.
A. E. W. FRAZER.